C. D. CROMLEY.
BAGGING MACHINE.
APPLICATION FILED NOV. 30, 1906. RENEWED JUNE 30, 1909.

947,096.

Patented Jan. 18, 1910.
12 SHEETS—SHEET 1.

C. D. CROMLEY.
BAGGING MACHINE.
APPLICATION FILED NOV. 30, 1906. RENEWED JUNE 30, 1909.

947,096.

Patented Jan. 18, 1910.

C. D. CROMLEY.
BAGGING MACHINE.
APPLICATION FILED NOV. 30, 1906. RENEWED JUNE 30, 1909.

947,096.

Patented Jan. 18, 1910.
12 SHEETS—SHEET 5.

C. D. CROMLEY.
BAGGING MACHINE.
APPLICATION FILED NOV. 30, 1906. RENEWED JUNE 30, 1909.

947,096.

Patented Jan. 18, 1910.

Witnesses:
Inv. L. McCathran.
L. L. Morrill

Inventor
Charles D. Cromley
By Mason, Fenwick & Lawrence
Attorneys.

UNITED STATES PATENT OFFICE.

CHARLES DOUGLAS CROMLEY, OF ALAMEDA, CALIFORNIA, ASSIGNOR TO AUTOMATIC PACKING COMPANY, OF SAN FRANCISCO, CALIFORNIA, A CORPORATION.

BAGGING-MACHINE.

947,096.  Specification of Letters Patent.  Patented Jan. 18, 1910.

Application filed November 30, 1906, Serial No. 345,763. Renewed June 30, 1909. Serial No. 505,264.

*To all whom it may concern:*

Be it known that I, CHARLES DOUGLAS CROMLEY, a citizen of the United States, residing at Alameda, in the county of Alameda and State of California, have invented certain new and useful Improvements in Bagging-Machines; and I do hereby declare the following to be a full, clear, and exact description of the invention, such as will enable others skilled in the art to which it appertains to make and use the same.

This invention relates to bagging machines, and has for an object to provide a device of the class embodying improved means for filling, packing and sewing bags.

A further object of the invention is to provide in a device of the class a rotating table adapted to support bags, and improved means carried by and rotating with the table adapted to fill and pack the bags.

A further object of the invention is to provide in a device of the class improved means for quickly filling the scales to approximately the maximum quantity required almost instantaneously and with auxiliary means for continuing and completing the filling at a slower rate whereby the exact quantity is secured.

A further object of the invention is to provide in a device of the class filling device proportioned to be inserted into and approximately filling a bag, and with improved means associated with the filling tube arranged to raise and lower the tube into and out of engagement with the bag and with improved means for packing material within the filling tube and its surrounding bag.

A further object of the invention is to provide in a device of the class a filling tube proportioned to be inserted within and substantially fill a bag and with a plunger arranged to operate within the tube upon a telescoping shaft.

A further object of the invention is to provide in a device of the class spaced hooks proportioned to permit a bag to be hung thereupon and with means for rotating the hooks, and a bag opener of improved form arranged for insertion within a bag and to serve to expand the bag during filling.

A further object of the invention is to provide in a device of the class a bag holder embodying a collapsible hoop adapted to serve as a bag opener and with spaced hooks positioned to permit the hanging of a bag thereupon and means to rotate the hooks to twist and tighten the open end of the bag upon the collapsible hoop.

With these and other objects in view, the invention comprises certain other novel constructions, combinations and arrangements of parts, as will be hereinafter more fully described and claimed.

In the drawings: Fig. 14 is a top plan view of a filling tube and associated parts similar to the tube shown at Fig. 13 but with the plunger rod locking means shown unlocked.

Like characters of reference designate corresponding parts throughout the several views.

The bagging machine forming the subject-matter of this application comprises means for conducting material to, holding, filling and packing the bag, and arranged for association and operation in conjunction with a sewing mechanism which forms the subject-matter of a copending application, filed the 30th day of November, 1906, serial No. 345,764.

In its preferred embodiment the bagging mechanism comprises a base 25 having an off-set portion 26 upon which is mounted the operating gearing. Upon the base 25 are erected a plurality of uprights 27, carrying at their upper end a plurality of substantially radial arms 28 forming the top of the supporting structure.

Within the uprights 27 and concentrically of the base 25 is mounted a shaft 29 journaled at its lower end in a bearing 30, and provided adjacent its lower end with a table 31, beneath which is arranged a circular rack 32 concentric with the shaft 29. The circular rack 32 is rigidly connected with the shaft 29 as by means of a hub 33 and receives motion from a pinion 34 carried rigidly upon a shaft 35. The shaft 35 is provided with a gear 36 interengaging with a pinion 37 carried upon a shaft 38. The shaft 38 receives motion by means of a gear 39 from a pinion 40 carried upon a shaft 41 upon which are mounted the usual fast and loose pulleys 42. Upon the shaft 38 is also mounted a gear 43 interengaging with a pinion 44 carried upon a shaft 45 which extends approximately across the base of the machine and intergears with a shaft 46 by means of bevel gears 47. The shaft 46 engages with a shaft 48 carrying upon its upper end a gear 49, from which the sewing mechanism, shown as a whole at 50, receives motion and is actuated.

Figure 3:
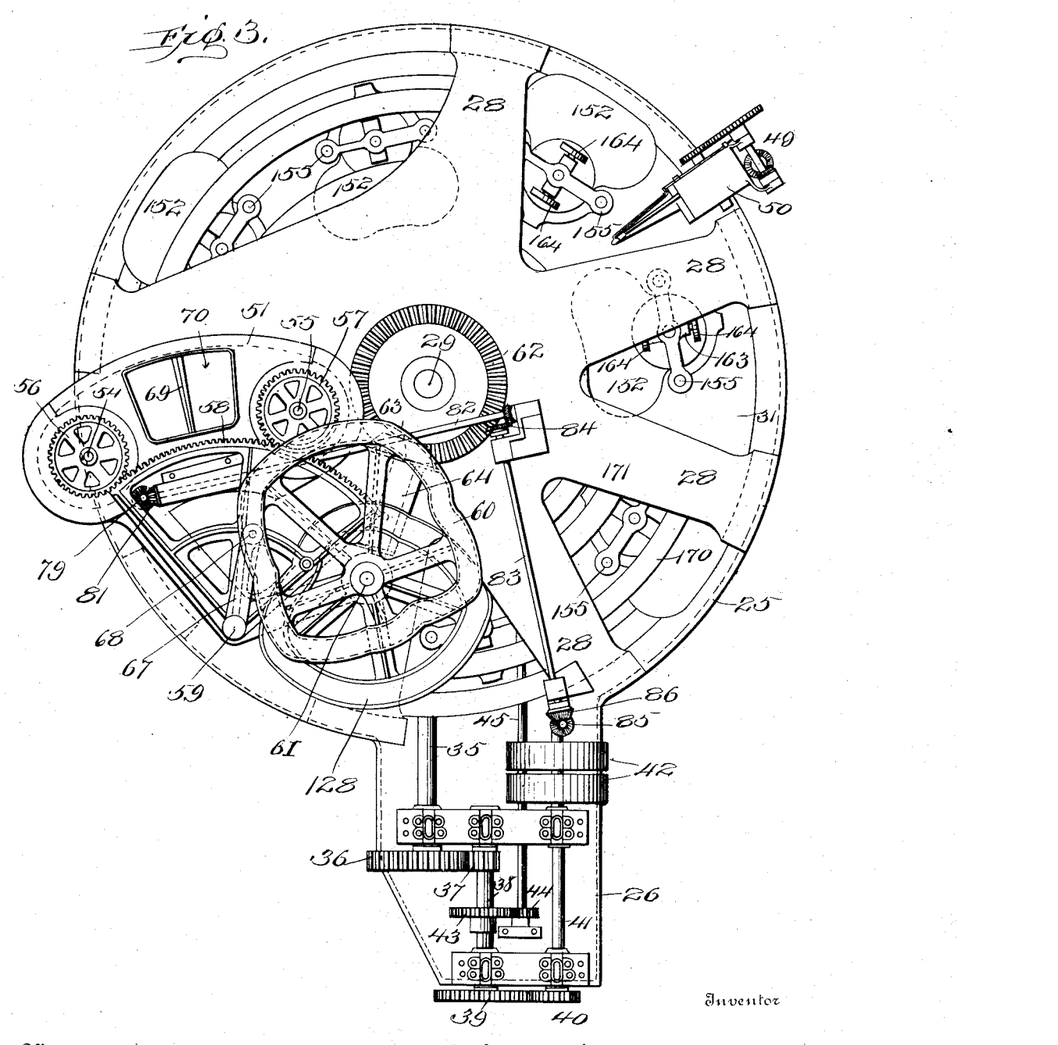
Fig. 3 is a top plan view of the improved bagging machine.
Figure 4:
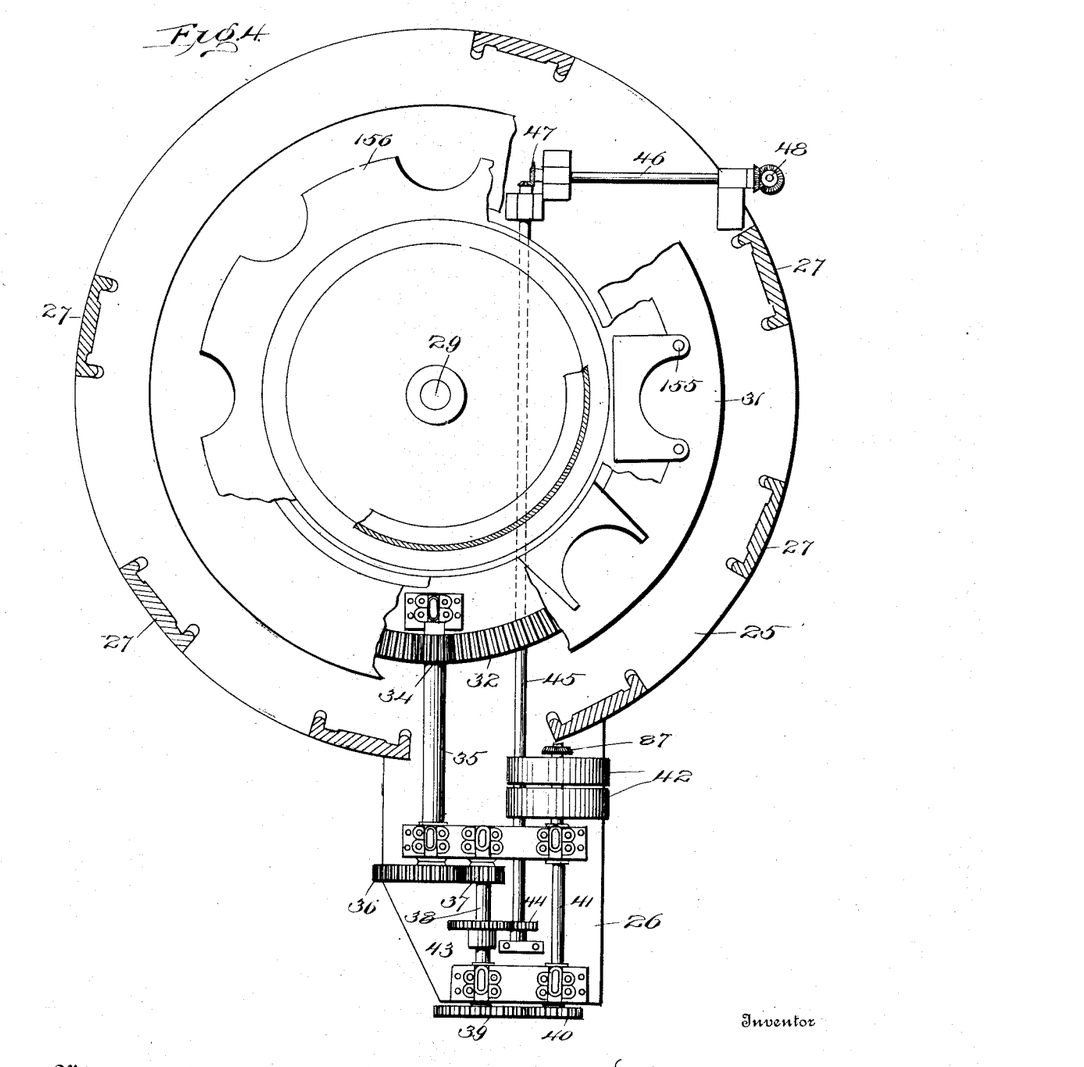
Fig. 4 is a top plan view of the rotating table portion of the machine with parts broken away to show the operating structure.

Upon the top of the supporting structure is mounted a casing 51 which may be of any approved form but preferably substantially crescent-shaped, as shown more particularly in Fig. 3. Within the opposite ends of the casing 51 are mounted semi-cylinders 52 and 53 mounted upon shafts 54 and 55, respectively. Upon the upper ends of the shafts 54 and 55 and without the casing 51 are respectively mounted gears 56 and 57, intergeared with a segmental rack 58, movable angularly with and pivoted by means of shaft 59 and operated by means of a cam 60 carried upon the upper extremity of a shaft 61. The shaft 61 receives motion from the central shaft 29 by means of a gear 62 mounted upon said shaft and having an interengaging bevel gear 63. The gear 63 is rigidly mounted upon a shaft 64 having a gear 65 intergeared with a bevel gear 66 carried upon said shaft 61. The means of imparting movement to the shaft 59 from the cam 60 comprises an arm 67 rigidly mounted upon the pivot shaft 59 and having a roller 68 engaging within the cam groove of the cam 60 so that as the cam 60 rotates the segment 58 is oscillated upon the shaft 59 to move the gears 56 and 57, and their associated parts alternately in opposite directions.

Figure 2:
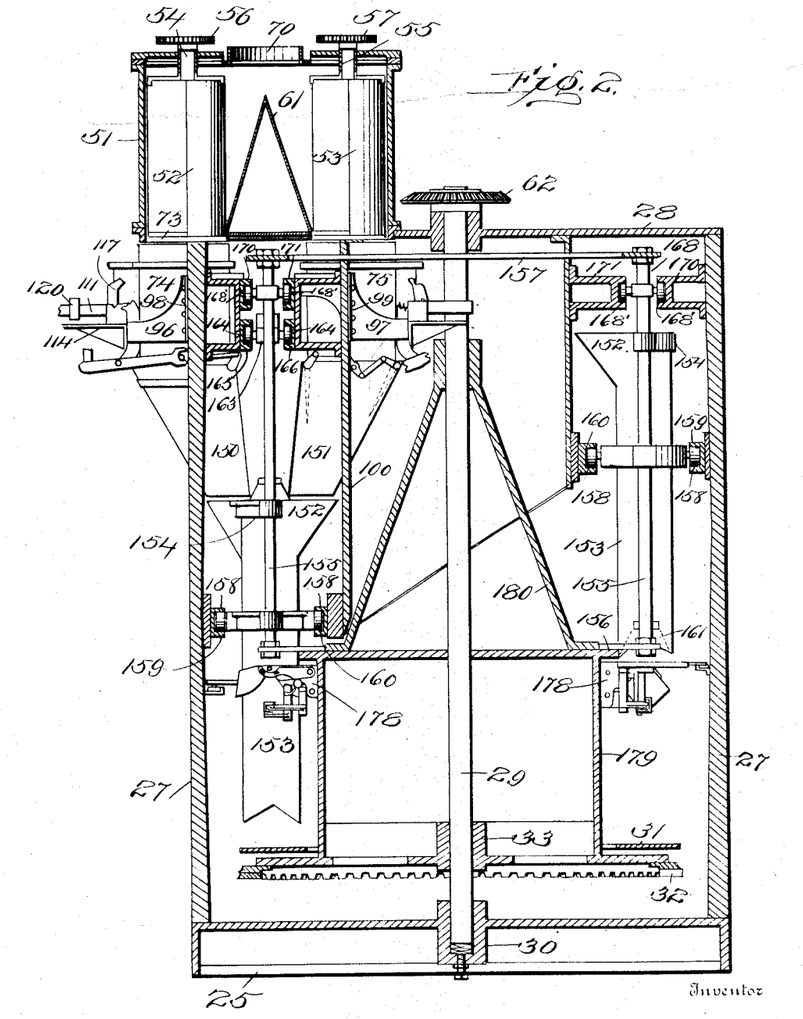
Fig. 2 is a view of the improved bagging machine in vertical section taken approximately diametrically of the machine.

Within the casing 51 is mounted a division board or baffle plate 69 positioned and disposed to direct material from the charging opening 70 to the opposite chambers in which rotate the semi-cylinders 52 and 53. The amount of material admitted to the semi-cylinders 52 and 53 is regulated by means of the reciprocal slides 71 and 72 by which a greater or lesser portion of the semi-cylinders is opened to receive material. When the semi-cylinders are in the position shown in Figs. 2, 5 and 6, the cylinder 52 is in position to prevent the receipt of material from the filling opening 70 and is disposed to dump material through the opening 73 into the scale pan 74, disposed beneath, while the semi-cylinder 53 is in position to receive a filling charge from the opening 70, guided thereto by the baffle plate 69. The dumping of the material from the semi-cylinders 52 and 53 to the scale pans 74 and 75 beneath is controlled by means of segmental plate 76 rigidly carried upon the shaft 59 and oscillating with the segmental gear 58.

Figures 6, 7:
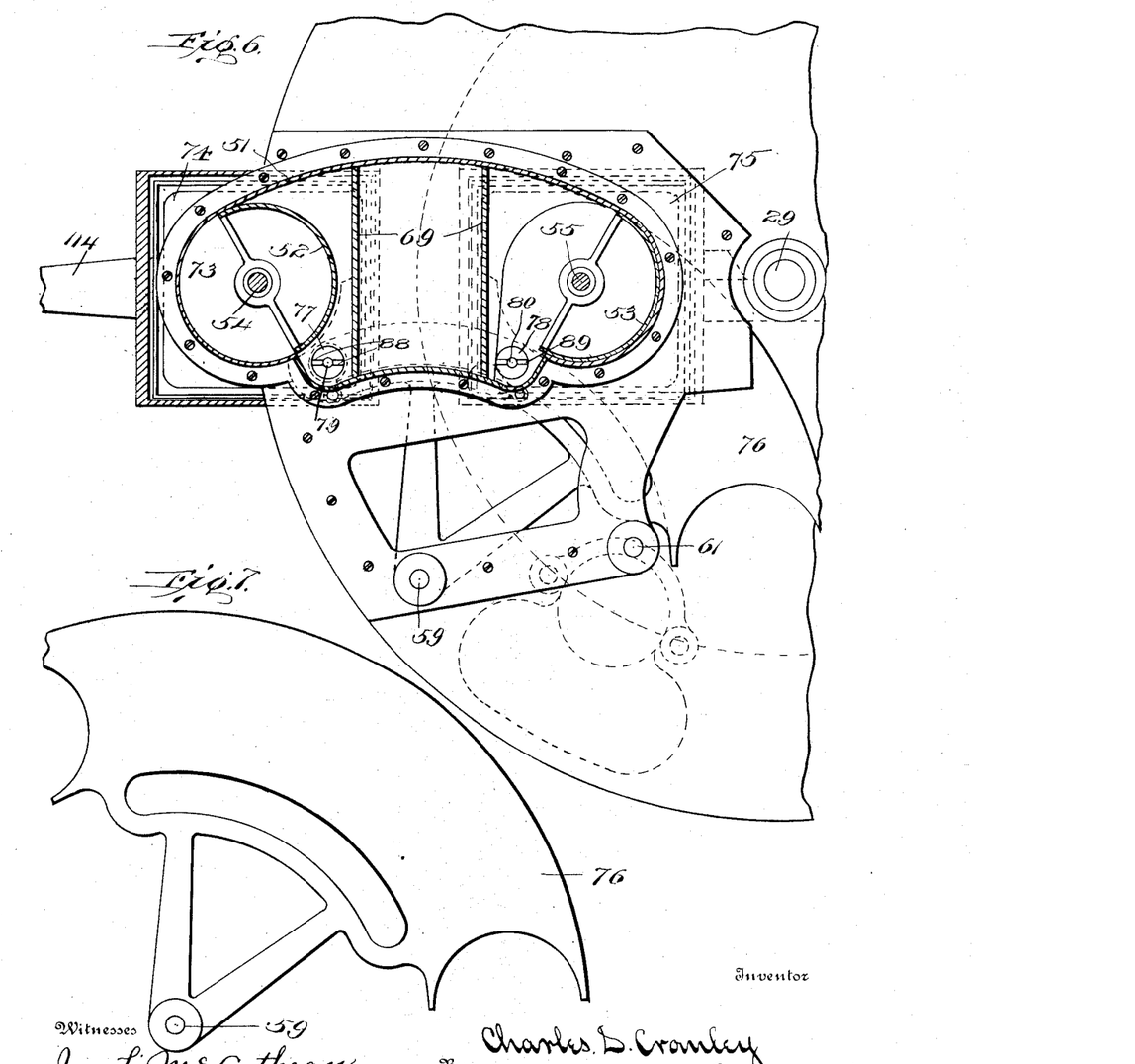
Fig. 6 is a top plan view of the scale filling device shown partly in plan and partly in horizontal section.
Fig. 7 is a top plan view of the closure plate used to close communication between the scale filling device and the scales.

As shown in Fig. 6 the segmental plate 76 is moved to cover the opening beneath the semi-cylinder 53 and to open the opening beneath the semi-cylinder 52 to permit discharge of material from the last-mentioned semi-cylinder into the scale pan 74. The rotating of the semi-cylinder, as 52, to dump its charge, disposes the semi-cylinder in position to prevent the flow of material from the charging opening 70 to the scale pan, and the amount of material admitted to the semi-cylinders is regulated by means of the slides 71 and 72, so that a very large proportion of the amount required to actuate the scale is fed to and dumped at one movement of one of the semi-cylinders. It is designed to so regulate the slides 71 and 72 that 90 to 95 per cent of the entire amount of material required to actuate the scale is fed to and dumped almost instantaneously from one of the semi-cylinders into the scale pan. To provide for the admission of material to complete the quantity required to actuate the scale openings 77 and 78 are provided. Above the openings 77 and 78 and within the casing 51 are mounted shafts 79 and 80 actuated by means of bevel gears 81 carried upon a shaft 82 intergeared with the shaft 83 by means of bevel gears 84 which latter shaft is intergeared with a shaft 85 by means of bevel gears 86, and with the shaft 85 receiving motion from the shaft 41 by means of a bevel gear 87. Upon the shafts 79 and 80 are mounted agitators 88 and 89 positioned to agitate the material within the casing above the openings 77 and 78 and to discharge through the said openings a smaller quantity of material into the scale pan beneath to complete the amount required to actuate the scale. Beneath the openings 77 and 78 are mounted slides 90 and 91 actuated respectively by rods 92 and 93 from the scale mechanism, so that when the exact amount of material is discharged from either of said openings into the scale pan to tip the scale, the tipping of said scale automatically closes the openings and prevents a further discharge therefrom into said scale pans.

The scale pans 74 and 75 are similar but reversed, and a description of one will serve to describe both. The scale pan 74 comprises a primary chamber 94 of large capacity and proportioned to receive material dumped from the semi-cylinders 52 and 53, and an auxiliary chamber 95 preferably in one corner of each of said pans and disposed beneath and to receive material from the auxiliary openings 77 and 78. To support the scale pans 74 and 75, brackets 96 and 97 are provided having, respectively, flanges 98 and 99, by means of which the brackets 96 and 97 are rigidly secured to one of the uprights 27 and to an inner frame piece 100. Carried by the bracket 96 is a block 101 provided with a knife edge and with a similar block similarly disposed upon the opposite side of the said bracket and upon which is mounted a frame 102 embracing the scale pan. The scale pan is mounted upon the frame 102 by means of a block 103, and a similar block similarly disposed upon the opposite side of said frame, said blocks being provided with the usual knife edges. The scale pan 74 is prevented from swinging by means of a block 104 carried by said scale pan and engaging a notch in a strip 105 carried by the bracket 96 so that when the scale pan is at the downward limit of its movement the block 104 is engaged.

Mounted upon the bracket 96 are spaced curved arms 106 and 107, joined by means of a shaft 108 journaled therein and upon which is mounted a bell crank lever 109 having a pin 110 positioned to engage the scale beam 111. The scale beam 111 is mounted upon a block 112 and a similar block upon the opposite side by means of a stud 113 carried rigidly by the said scale beam and provided with knife edges engaging notches in the upper ends of the said block 112 and its similar associated spaced block. To the bracket 96 is rigidly secured an arm 114 carrying adjacent its extremity the usual point 115 and set screw 116, for limiting the movement of the scale beam 111. Adjacent the stud 113 the scale beam is bent substantially at right angles to form an upwardly extending arm 117 provided at its upper extremity with a notch engaged within which is a bar 118, supporting the arm 102 by means of an extension 119. The arm 117 is curved backwardly so that the point of engagement of the bar 118 is rearwardly of the stud 113 so that the pressure of the frame 102, carrying the scale pan 94, is upon the scale beam rearwardly of the pivoting stud 113 and to raise the extended end of the scale beam when the material in the scale pan is sufficient to counter-balance the scale weight 120.

Figures 8, 25:
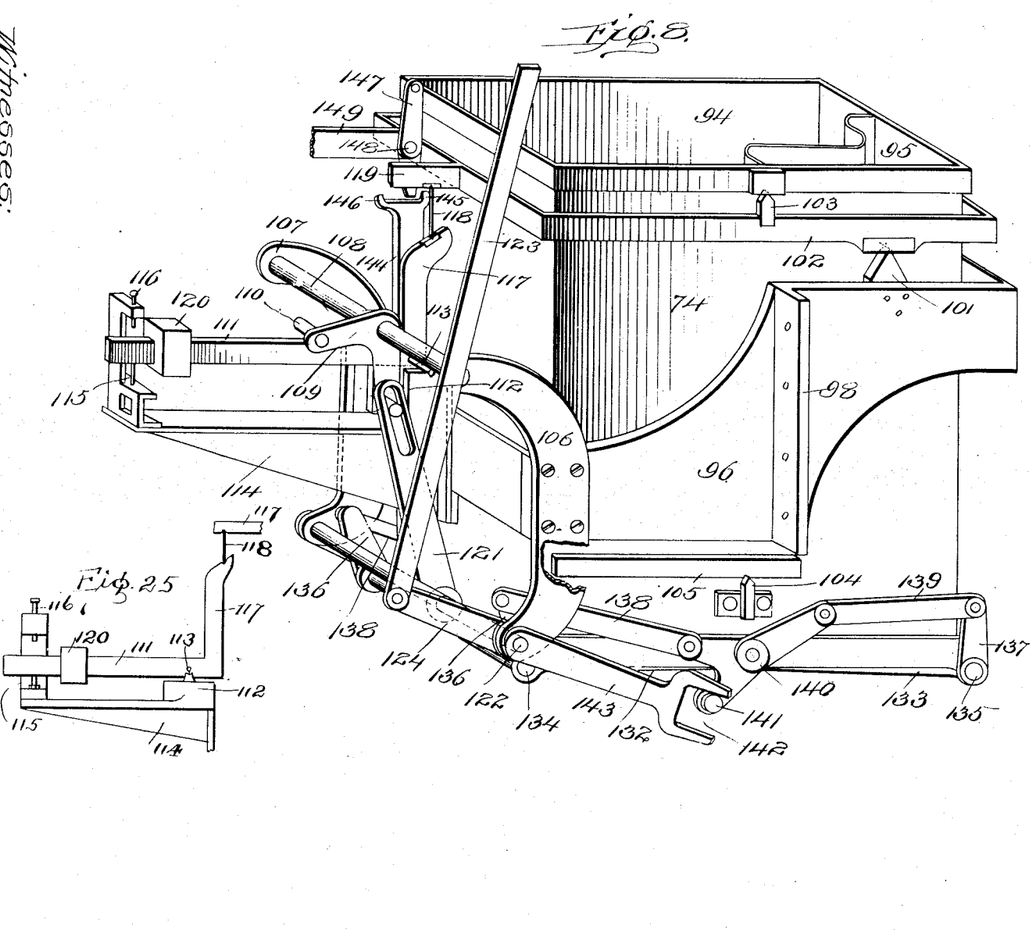
Fig. 8 is a perspective view of the scale.
Fig. 25 is a detail view in side elevation of the scale beam.

While the material from the semi-cylinders 52 and 53, which may be of considerable weight, are being dropped into the scale pan 94, the scale beam 111 is held in lowered position by means of the pin 110 and bell crank lever 109 which said lever is actuated by means of an arm 121 rigidly mounted upon a shaft 122 and actuated by means of a link 123. The link 123 is connected with the shaft 122 by means of an arm 124 and receives actuating impulse through the medium of a bell crank lever 125 which in turn is actuated by a link 126 pivotally engaging a lever 127 which receives motion from a cam 128 rigidly mounted upon the shaft 61. For actuating the mechanism associated with the scale pan 75, a lever 129 engages and is actuated by the cam 128 and through the medium of a rigidly associated arm 130, and a link 131 transmits similar motion to the opposite scale pan. The scale pans 74 and 75 are further provided each with a trap bottom comprising, respectively, the sections 132 and 133, and 132' and 133'. The sections of the bottom are hinged, respectively, as at 134 and 135, and are actuated by means of arms 136 and 137, carried rigidly at the pivot portion of the hinges 134 and 135, which said arms are connected by links 138 and 139, respectively, with a rocker 140. The rocker 140 is so constructed that when the bottom sections 132 and 133 are closed the links 138 and 139 have passed the center upon which the rocker 140 is journaled, and the bottom sections are thereby held in closed position until released. The rocker 140 is provided with a stud 141 engaging with a recess 142 formed in the end of the lever 143, which said lever 143 is rigidly secured to the shaft 122 and actuated by an arm 124 and a link 123. When the contents of the semi-cylinders 52 and 53 are to be dumped into the pan 94 the bottom sections are held more firmly closed by the fork 143 being disposed in the position shown in Fig. 8 and the scale 111 is held down by pin 110.

After the contents of the semi-cylinder have been dumped into the scale pan the link 123 is moved by its associated cam parts, above described, so that by rotating the shaft 122 slightly, the pin 110 is lifted from the scale beam 111, and the fork 143 raised so that the stud 141 is no longer engaged by the fork and whereby the scale pan is then released from all constraint, and hangs simply upon the blocks 103. When material has been introduced into the scale pan through the auxiliary openings to supply the required weight the pressure of the bar 118 upon the short end of the scale beam depresses that end. Carried by the scale beam is also an arm 144 provided at its upper ends with spaced lugs 145 and 146 arranged to engage the lower end of a lever 147 which is pivoted, as at 148, to an arm 149 rigid with the frame. To the upper end of the arm 147 is secured the rod 92 which actuates the slide 90 to close the auxiliary opening 77, so that when the scale beam is moved under the stress of the material contained in the scale pan, the lever 149 is moved angularly to slide the closure 90 to prevent the further inflow of material from the auxiliary opening into the scale pan.

Figure 1:
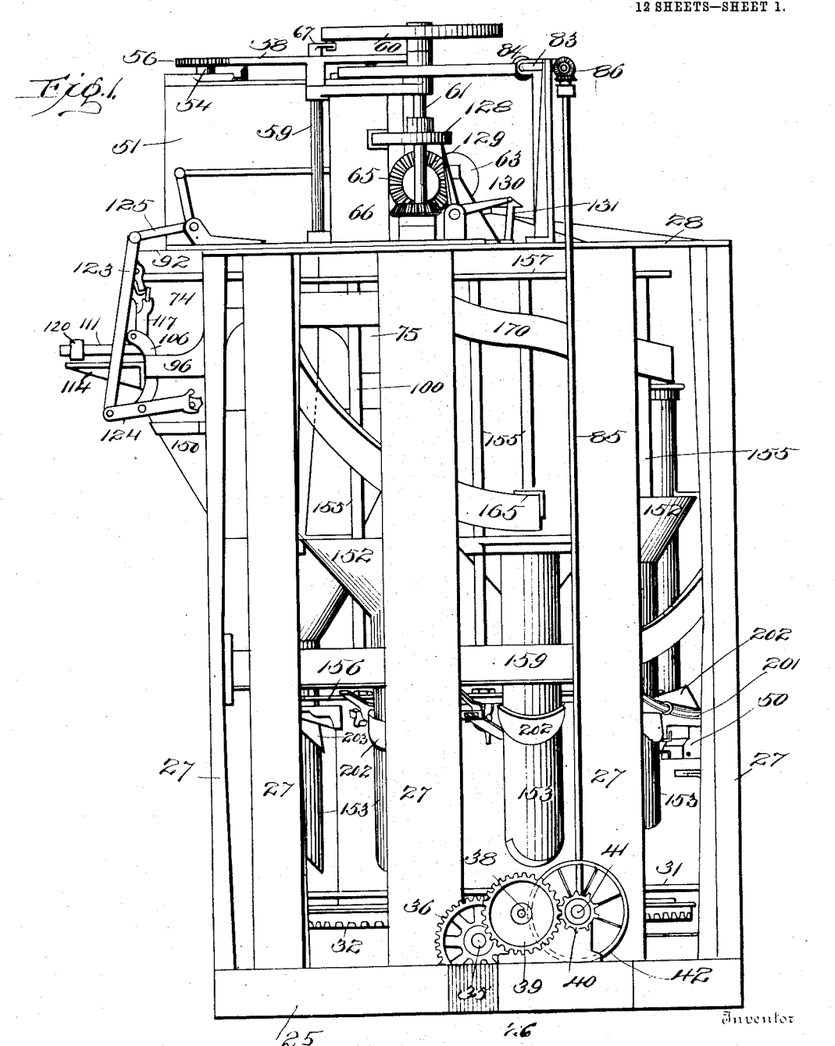
—Figure 1 is a view of the improved bagging machine in side elevation.
Figure 5:
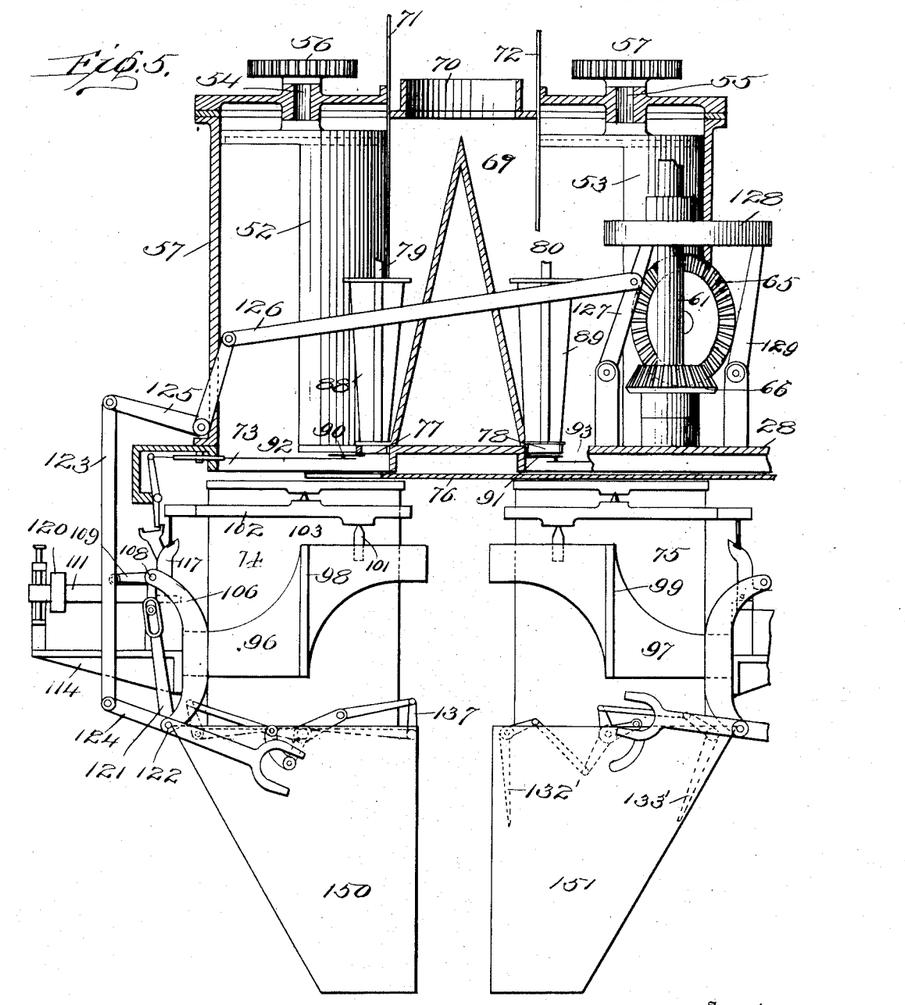
Fig. 5 is a vertical, sectional view of the scale filling device.

When the cam 128 is rotated to the proper point, the fork 143 is actuated by the connecting parts above described so that the lower prong of the form engages and raises the stud 141 and opens the bottom sections, as shown in Fig. 5 at 132' and 133'. Beneath the scale pans 74 and 75 are, respectively, disposed chutes 150 and 151, into which the material from the scale pans 74 and 75 are dumped and by which the material is guided into the hoppers 152 of the filling tubes. The filling tubes 153 are mounted about the shaft 29 and above the table 31, and are provided with collars 154, engaging and sliding vertically upon rods 155 which are rigidly connected at their lower ends with an annular disk 156, concentric with the shaft 29 and at their upper ends with a disk 157, also concentric with and both operated by a shaft 29. The collars 154 are also provided with rollers 158 disposed diametrically of each other upon alined trunnions and substantially at right angles to the rods 155. The rollers 158 engage within spaced tracks 159 and 160 which are rigidly secured to the inner surface of the uprights 27, as particularly shown in Figs. 1, 2 and 24.

Figures 9, 10:
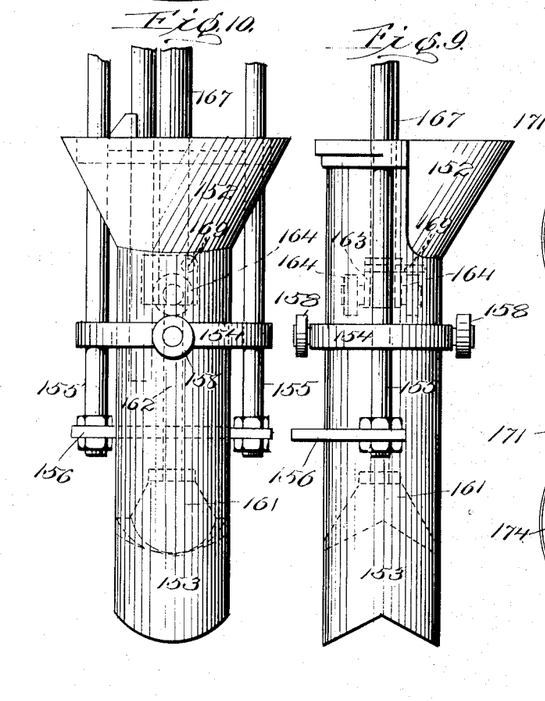
Fig. 9 is a view of the bag filling device and associated parts shown in side elevation.
Fig. 10 is a view of a bag filling tube and associated parts shown in side elevation taken at right angles to Fig. 9.
Figures 11, 15:
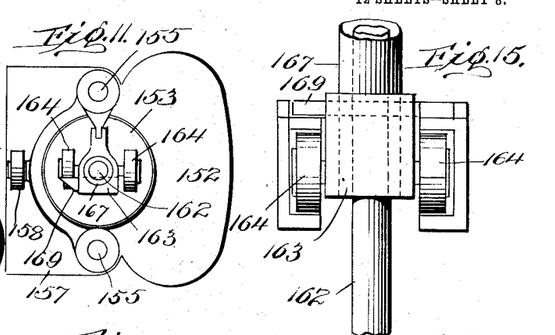
Fig. 11 is a top plan view of the tube shown at Fig. 9 and similarly situated.
Fig. 15 is a view in side elevation of fragments of the telescoping plunger rod sections.
Figure 12:
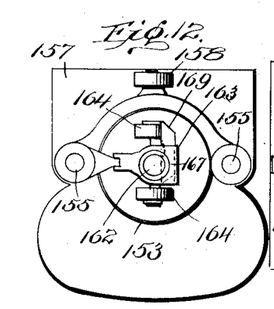
Fig. 12 is a top plan view of the tube shown at Fig. 10 similarly positioned.

Within the filling tubes 153 are mounted packing heads 161 carried at the extremities of rod sections 162 forming part of plunger 162'. Near its upper end the plunger rod section 162 is provided with a block 163 upon opposite sides of which are journaled rollers 164 positioned to engage spaced tracks 165 and 166, rigidly connected with the frame, as particularly shown in Figs. 1, 2 and 24. The plunger rod 162' comprises the rod section 162 and a sleeve section 167 within which the rod section 162 is mounted to reciprocate the said sleeve 167 having at its upper end a block 168 with rollers 168' positioned to engage tracks 170 and 171, carried rigidly by the frame. The block 163 is provided with a slide 169 movable laterally therein which said slide is provided with a notch or concave recess 172 proportioned to fit and permit the passage of the plunger rod section 162, and to be moved slidably by means of spaced cam stops 173 and 174 mounted alternately upon opposite tracks 170 and 171, respectively, so that as the block 163 passes along between said tracks the said stud is alternately moved to release and lock the plunger rod 162. The plunger head 161 carried upon the plunger rod 162 is formed at its lower side with an inwardly disposed angular face, as shown particularly in Fig. 9, so that the material within the bag is brought to a peak to permit the sides of the bag to be folded together, as shown particularly in Fig. 23.

Adjacent the lower end of each of the filling tubes 153 are mounted bag holding and opening mechanisms comprising spaced brackets 175 and 176 rigidly connected together and pivoted, as at 177, to a bracket 178, rigidly connected to a cylindrical carrier 179 mounted to rotate upon the shaft 29 and braced by means of inclined braces 180. Upon the extremities of the brackets 175 and 176 are journaled worms 181 and 182 having at their inner or adjacent ends bag receiving and supporting hooks 183 and 184, adapted to support the corners of the upper open end of a bag when hung thereupon. Mounted and longitudinally movable upon the worms 181 and 182 are nuts 185 and 186 carried by bell crank levers 187 and 188, pivoted, respectively, at 189 and 190. The levers 187 and 188 are arranged to move synchronously in opposite directions by means of levers 191 and 192, pivoted as at 193 and 194, and connected at their adjacent ends by a pin as at 195.

The bell crank lever 188 is primarily actuated by means of a plunger 196 slidably mounted within the sleeve 197 which is carried by means of an arm 198, which said arm is pivoted, as at 177, and rigidly connected with the brackets 175 and 176, which are movable therewith. The inner end of the plunger 196 is pivotally connected with the link 198, the other end of which is pivoted to the arm 199 of the bell crank lever 188, so that when the plunger 196 is forced inwardly the bell crank lever 188 is initially moved and the bell crank lever 187 moved synchronously therewith, as described. At its extremity the plunger 196 carries a roller 200 proportioned and positioned to engage a track 201 provided with means for moving the plunger longitudinally within the sleeve 197 and pivotally upon the pivot 177.

Pivoted between the extremities of the brackets 178 are the bag openers comprising curved plates 202 and 203, proportioned when closed to meet at a line, as 204, and provide a segmental corner, as 205, proportioned to enter the interval between the opposite sides of the bag, as hung upon the hooks 183 and 184. The bag opener plates 202 and 203 are pivoted, as at 206, by means of reinforcing semi-collars 207 and 208, and are actuated by means of an arm 209, fulcrumed by means of a shaft 210, and actuated by means of a roller 211 carried by the frame upon which the brackets 175 and 176 are mounted. The arm 209 is provided with slots 212 and 213 the walls of which embrace, respectively, lugs 214 and 215 rigidly connected with the reinforcing collars 207 and 208.

Figures 16, 18:
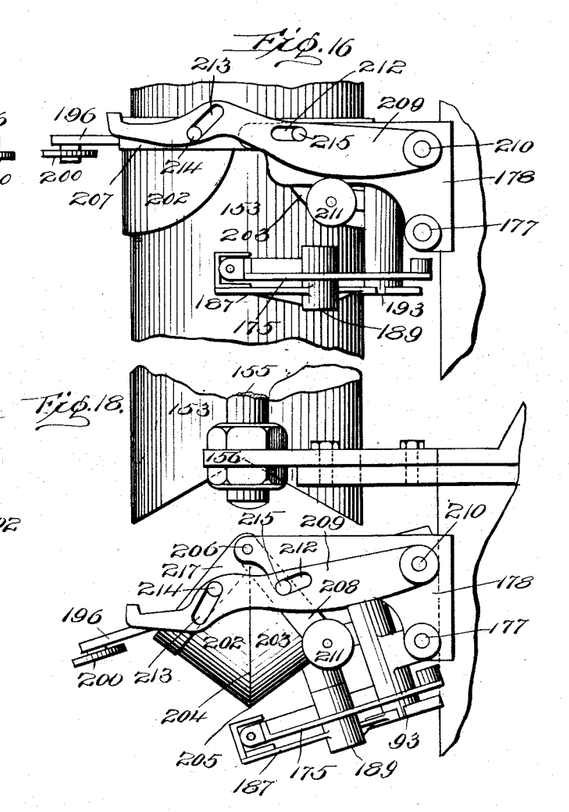
Fig. 16 is a view in side elevation of the bag opener in open position.
Fig. 18 is a view in side elevation of the bag opener in closed position and the lower end of the filling tube at its upper limit.
Figures 17, 19:
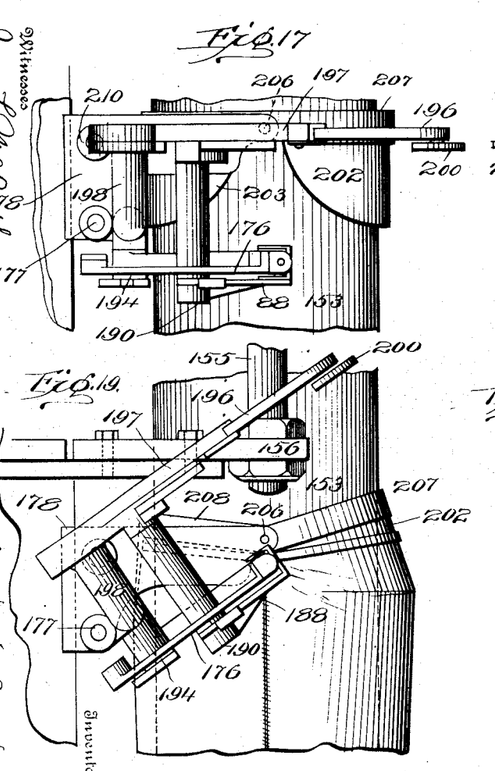
Fig. 17 is a view of the bag opener shown in open position and in elevation from the side opposite that shown in Fig. 16.
Fig. 19 is a view in side elevation of the bag opener, bag holder and filling tube associated in the necessary relation for filling and packing the bag.
Figures 20, 22:
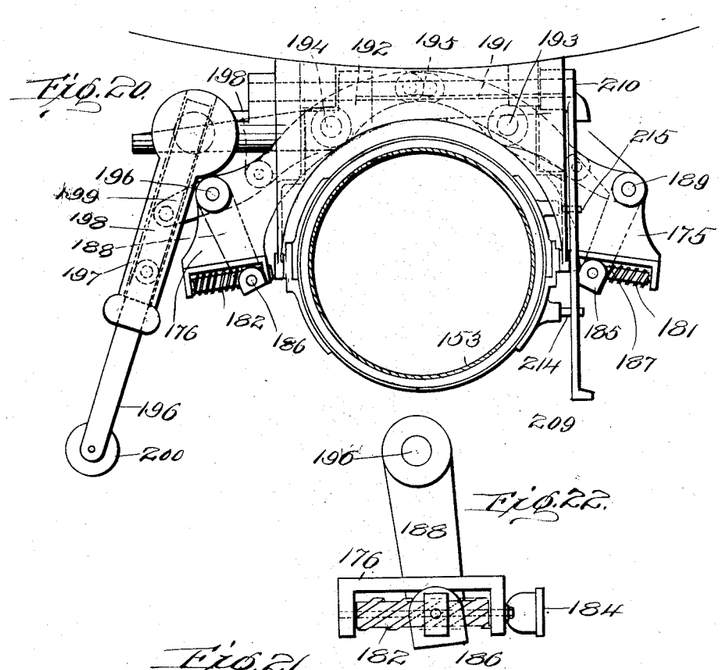
Fig. 20 is a top plan view of a filling tube and bag holding mechanism.
Fig. 22 is a detail plan view of one of the worms and associated parts for operating a bag holder and its operating parts.
Figure 21:
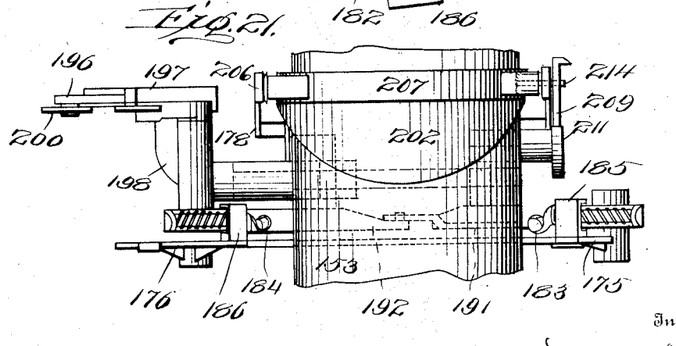
Fig. 21 is a view in front elevation of a fragment of a filling tube with the bag holder and bag opening mechanism associated therewith.

In operation the table and associated parts are rotated upon the shaft 29, as above described, and a bag is hung by an operator upon the hooks 183 and 184, when the hooks and worms are in the position shown in Fig. 18. The hooks 183 and 184 are sufficiently wide to open the bag a longitudinal crack which is disposed immediately below the corner 205 of the bag opener shown in Fig. 18. The curvature of the track 201 acting upon the roller 200 then raises the bag holder hooks so that the bag embraces the lower pointed ends of the curved plates 202 and 203. A continued rise of the bag holder engages the roller 211 against the arm 209 which, upon being raised, opens the bag holder to the position shown at Figs. 16 and 17. A continued movement of the roller 200 upwardly to the position shown in Fig. 19 further elevates the bag holder hooks and spreads the bag openers so that the sides are inclined to be larger at the bottom than at the top, as particularly shown in Fig. 19. The curvature of the track 200 then operates to move the plunger 196 inwardly and by means of the mechanism described to rotate the worms 181 and 182 to turn the bag engaging hooks and twist the bag firmly upon the bag opening plates 202 and 203, as shown at Fig. 19. In this position, with the bag holders disposed as shown, the bag is held firmly against displacement.

Figure 13:
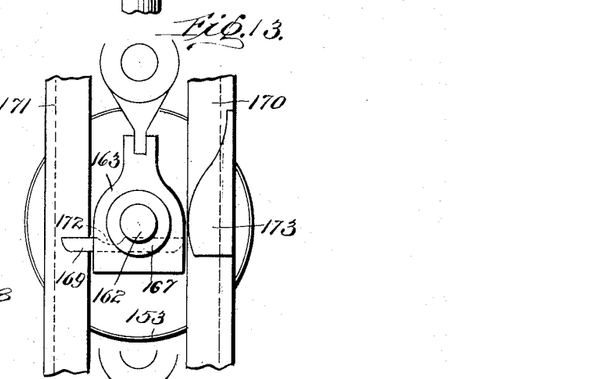
Fig. 13 is a top plan view of the filling tubes and associated parts showing in detail the means for locking the telescoping plunger, and shown in locked position.
Figure 23:
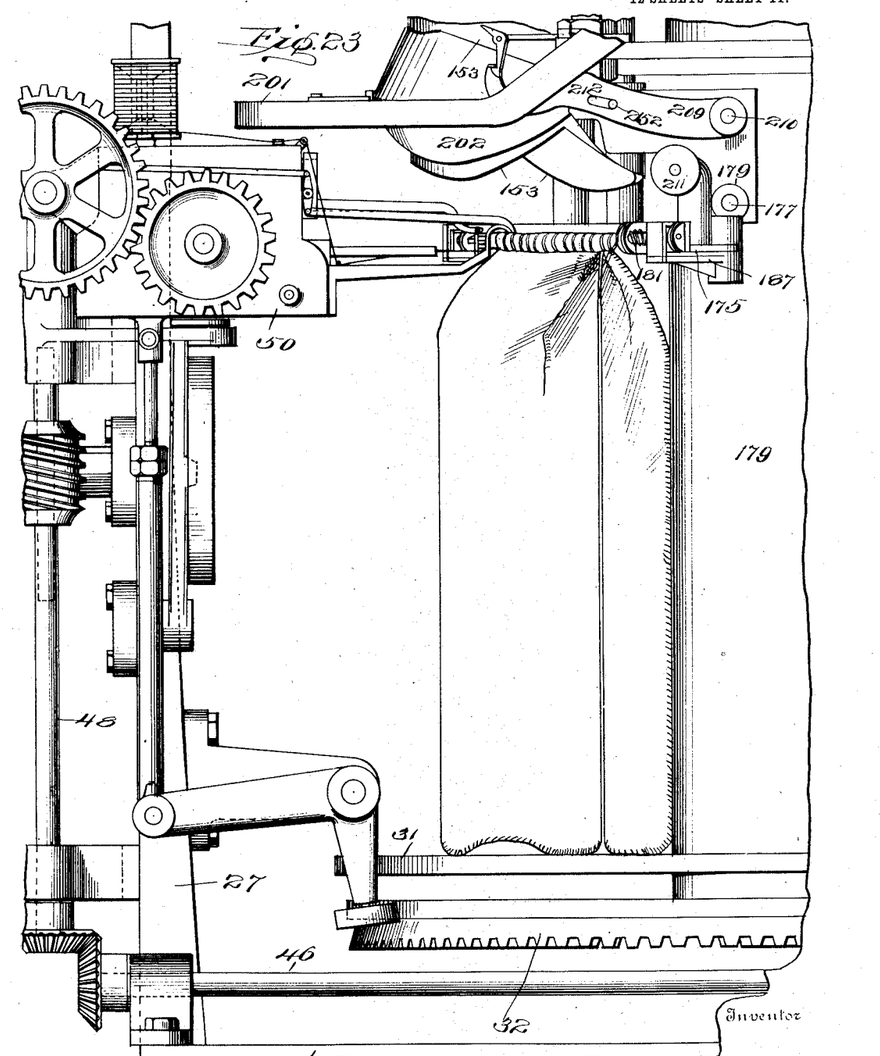
Fig. 23 is a view of the sewing mechanism in side elevation with the bag holding means associated therewith in perspective.
Figure 24:
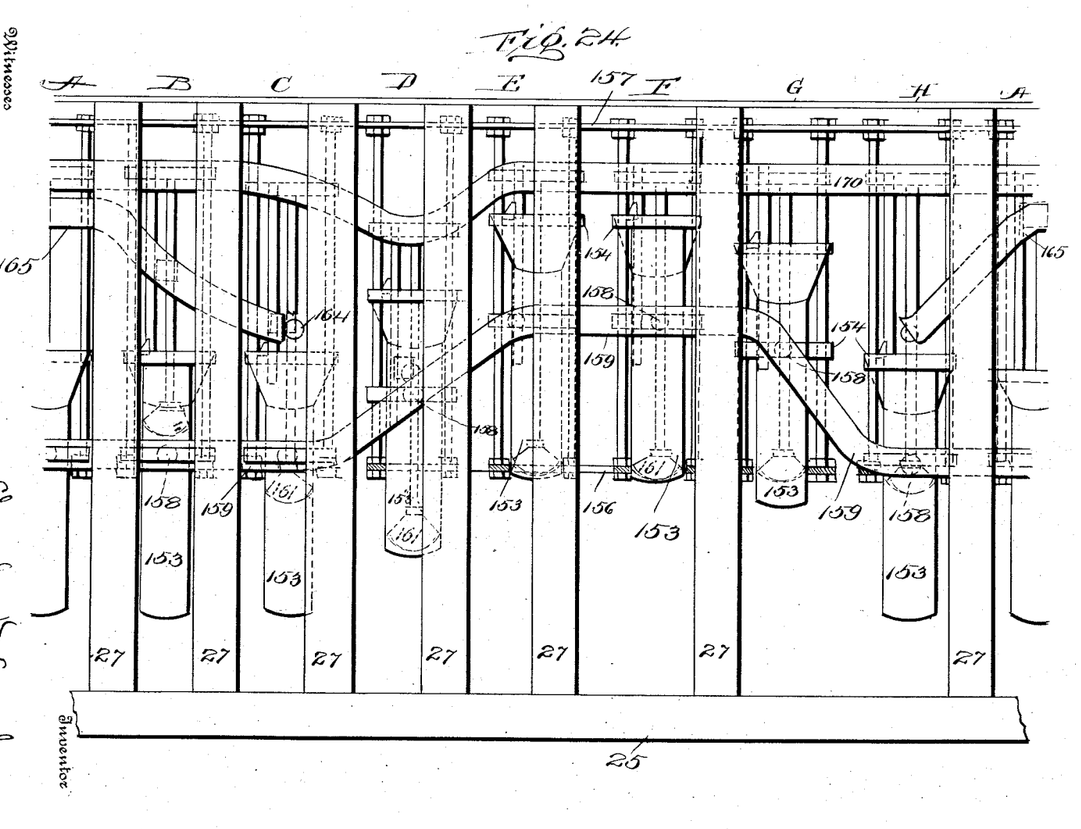
Fig. 24 is a diagrammatic view of the means for operating the filling tubes and plungers and showing the tubes and plungers associated in their several relative positions.

The filling tube 153 associated with the bag holding means described, would be positioned as shown at E and F in Fig. 24, while the bag was being hung upon the hooks, and the bag opener and hooks moved to the position shown in Fig. 19. Fig. 24 shows the operation of the filling tubes showing the various positions assumed by one tube and plunger during one revolution of the table. As soon as the bag has been securely fastened upon the bag holder and bag opener, the tube associated therewith is moved downwardly by means of the track 157, as shown at G and H in Fig. 24, so that practically the entire bag is filled by the filling tube 153. At A the material from the chutes 150 and 151 is directed into the filling tube from the scale pans which are opened as hereinbefore described and with the filling tube remaining substantially stationary relative to the bag the plunger is forced downwardly as shown at B and C in Fig. 24. When the rollers 164 pass out from the end of the interrupted track 165 the telescoping plunger rod is locked to form one rigid rod by means of the movement of the slide 169 to the position shown in Fig. 13, whereupon the plunger is forced still farther downwardly by the track 170. Meantime the filling tube 153 has been raised as shown at D in Fig. 24 so that the final downward movement of the plunger, and the upward movement of the filling tube are simultaneously to force the material in the bag to fill the space formerly occupied by the filling tube. The plunger and filling tube are then raised by means of the tracks 159 and 170 to the position shown at E at which point the bag holding hooks are dropped to the position shown at Figs. 7 and 23, and the worms and associated hooks further rotated by means of a longitudinal movement of the plunger 196 to roll the top of the bag, as shown in Fig. 23, and is then submitted to the operation of the sewing machine shown conventionally at 50, which sews the top of the bag with an over and over stitch. After the sewing is completed the bag is disengaged by a reverse movement of the worms and the filled bag removed by an attendant.

The weighing mechanism *per se*, above described, forms no part of the present invention but a description of its construction and operation is found to be essential to the clear understanding of the workings and operation of the bagging machine and the means for delivering material to the machine.

What I claim is:—

1. In a bagging machine, means to support a bag, a filling tube, means to move the filling tube vertically, a telescoping plunger rod, a plunger head carried by the plunger rod within the filling tube, and means to move the plunger rod independently of the filling tube.

2. In a bagging machine, means to support a bag, a filling tube, a plunger rod composed of telescoping sections, means to lock the telescoping sections rigidly together, a plunger head carried by the plunger rod and disposed within the filling tube, and means to move the plunger rod sections independently of each other.

3. In a bagging machine, a filling tube, means to support a bag to embrace the tube, a plunger rod comprising telescoping sections, means arranged to lock the sections rigidly together, a plunger head carried by the plunger rod disposed within the filling tube, means arranged to move the interlocked telescoping sections, means to disengage the telescoping sections, and means for moving the telescoping sections independently of each other.

4. In a bagging machine, a bag opener comprising pivoted curved plates proportioned to meet at a curved corner, means to support a bag, and means to move the bag holding plates upon their pivots.

5. In a bagging machine, a bag opener comprising pivoted curved plates proportioned to meet at a curved corner, means to insert the corner between the opposite sides of a bag, and means to open the bag opener within the bag.

6. In a bagging machine, a bag opener comprising pivoted semi-cylindrical plates having curved lower edges arranged and positioned to meet at a curved corner, means to support a bag, means to insert the curved corner of the bag opener within the bag, and means to expand the bag opener to provide reversely inclined diverging sides.

7. In a bagging machine, a frame pivotally mounted, bag engaging hooks carried by the frame, a bag opener disposed above the frame and comprising semi-cylindrical plates proportioned to meet at a curved corner, means to raise the bag supporting hooks upon opposite sides of the bag opener, and means carried by the frame for expanding the bag opener.

8. In a bagging machine, a bag opener comprising semi-cylindrical plates proportioned to meet at a curved corner, means for expanding the plates to provide reversely inclined diverging sides, bag supporting hooks disposed upon opposite sides of the bag opener, and means for rotatably moving the bag supporting hooks to twist the bag upon the expanded plates.

9. In a bagging machine, a bag opener comprising semi-cylindrical plates proportioned to meet at a curved corner, means to expand the plates to provide reversely inclined diverging sides, means to twist a bag firmly upon the expanded plates, and a filling tube proportioned to be inserted within the expanded plates.

10. In a bagging machine, a casing, material measuring means disposed at opposite ends of the casing, a scale disposed beneath each measuring mechanism, a segmental plate arranged to close communication between the casing and the scale, and means to oscillate the segmental plate to open opposite ends of the casing alternately.

11. In a bagging machine, a casing, a semi-cylinder journaled within opposite ends of the casing, means to rotate the semi-cylinders, a segmental plate arranged to close the lower side of the casing, and means to oscillate the segmental plate to alternately open opposite ends of the casing beneath opposite semi-cylinders.

12. In a bagging machine, a frame, a positively driven central shaft, a casing mounted upon the frame, rotarily moving measuring means mounted within the casing, gears disposed without the casing and associated with the measuring means, a segmental rack mounted to oscillate and in engagement with the gears, a cam arranged to oscillate the segmental rack, and means for transmitting motion from the positively driven shaft to the cam.

13. In a bagging machine, a frame, a table mounted to rotate upon a central positively driven shaft, means carried by the table for supporting a plurality of bags, a scale carried by the frame, means for discharging material from the scale into the bags, a casing mounted upon the frame, a material measuring mechanism mounted within the casing, a gear arranged to operate the measuring means, a segmental rack arranged to operate the gears, a cam arranged to operate the segmental rack, and means for transmitting power from the central positively driven shaft to the cam.

14. In a bagging machine, an upright structure, a table arranged to rotate within the upright structure, means carried by the table for holding a bag, a vertically movable filling tube, a cam carried by the structure arranged to move the filling tube, a plunger mounted to reciprocate within the filling tube, a cam carried by the structure arranged to move the plunger, and means to introduce material into the filling tube.

15. In a bagging machine, an upright structure, a table mounted to rotate within the structure, a bag opener carried by the table and adapted to hold a bag, a filling tube mounted to reciprocate vertically within the bag opener, means carried by the structure for reciprocating the filling tube, a plunger mounted to reciprocate within the filling tube, means carried by the structure for reciprocating the plunger, and means to introduce material into the filling tube.

16. In a bagging machine, an upright structure, a table mounted to rotate within the structure, a bag opener pivotally secured to the table and adapted to hold a bag, a filling tube mounted to reciprocate vertically within the bag opener, a cam carried by the structure adapted to reciprocate the filling tube, a plunger mounted to reciprocate vertically within the filling tube, a cam carried by the structure adapted to reciprocate the plunger, and means to introduce material into the filling tube.

17. In a bagging machine, a filling tube, a jointed plunger mounted to reciprocate within the filling tube, and means to operate one section of the plunger independent of the other.

18. In a bagging machine, a filling tube, a plunger mounted within the filling tube, and provided with a telescoping rod, means to reciprocate the plunger and one section of the rod independent of the other, means to lock the sections rigidly together, and means to operate the locked sections.

19. In a bagging machine, a filling tube, a plunger mounted to reciprocate within the filling tube, and embodying a telescoping rod, a lock carried by one of the sections of the rod and adapted to engage the other, means to operate the plunger and one section of the rod independent of the other, means to actuate the lock, and means to actuate the locked sections.

20. In a bagging machine, a filling tube mounted to reciprocate a plunger mounted to reciprocate within the filling tube, and embodying a telescoping rod, means to reciprocate the filling tube, means to reciprocate the plunger and one section of the rod independent of the other, means to lock the sections of the rod rigidly together, and means to reciprocate the locked sections with a movement independent of the movement of the filling tube.

21. In a bagging machine, a filling tube mounted to reciprocate, a cam arranged to actuate the filling tube, guides engaging and adapted to position the filling tube, a plunger mounted to reciprocate within the filling tube, and means to actuate the plunger independent of the filling tube.

22. In a bagging machine, a filling tube, means to reciprocate the filling tube, a plunger mounted within the filling tube and embodying a telescoping rod, a lock carried by one section of the rod and adapted to engage the other section, a cam arranged to operate the plunger and one section of the rod independent of the other, means to actuate the lock, and a cam arranged to actuate both sections of the rod and plunger in locked relation.

23. In a bagging machine, a plunger embodying a telescoping rod, a block carried at the extremity of one of the sections of the rod, locking means carried by the block, a guide engaging the block and adapted to prevent rotary movement, a cam arranged to engage with the block and produce movement of the plunger, means to actuate the lock, and a cam arranged to engage with the other section of the rod, and to actuate the locked sections simultaneously.

24. In a bagging machine, a plunger embodying a telescoping rod, an interrupted cam track positioned to actuate the plunger, and one section of the rod, means to lock the sections of the rod rigidly together, and a cam track spanning the interrupted interval of the other track, and adapted to actuate the sections in their locked relation.

25. In a bagging machine, a filling tube, a pan mounted above the filling tube, means carried by the pan to control the flow of material therefrom into the tube, a cam arranged to actuate the controlling means, means to discharge a quantity of material into the pan, means to permit a limited continued flow of material into the pan, and means actuated by the pan to cut off the limited flow.

26. In a bagging machine, a filling tube, a pan mounted above the filling tube and provided with a trap bottom, a chute forming communication between the pan and the filling tube, a cam arranged to actuate the trap bottom, and means to discharge material from the pan.

27. In a bagging machine, a bag holder comprising substantially semi-cylindrical members pivotally connected and meeting to form a corner, means connected with and to expand the members within the bag, means adjacent to and adapted to twist the bag upon the expanded members, and means adapted to reverse the twisting means to release the bag from the members.

28. In a bagging machine, a bag holder comprising substantially semi-cylindrical members pivotally connected, and comprising curved edges meeting at a curved corner, means to engage a bag and lift it upon the members and upon opposite sides of the curved corner, means to expand the pivoted members within the bag, means to twist the bag upon the expanded members, and means to release the bag from the members.

29. In a bagging machine, a rotating structure, a bracket carried by the rotating structure, substantially cylindrical members pivoted upon the brackets and embodying curved edges meeting at a curved corner, means pivoted upon the bracket for engaging the edge of a bag, means to lift the bag into engagement with the semi-cylindrical members upon opposite sides of the curved corner, means to expand the semi-cylindrical members within the bag, and means to twist the bag firmly upon the expanded members.

30. In a bagging machine, a bag holder comprising semi-cylindrical members pivotally connected and embodying curved edges meeting at a curved corner, a cam adapted to expand the members to a position with their cylindrical sides disposed to form an angle, a pivoted frame adapted to move a bag into engagement with the members, and upon opposite sides of the curved corner, and rotating members carried by said frame adapted to twist a bag upon the expanded members adjacent their smaller circumference.

31. In a bagging machine, a rotating structure, a bracket carried by the rotating structure, semi-cylindrical members pivoted upon the bracket, means to lift a bag into engagement with the semi-cylindrical members, means to expand the semi-cylindrical members within and to retain the bag, and a filling tube carried by the rotating structure, and adapted to reciprocate within the expanded members and bag.

32. In a bagging machine, a rotating structure, a bracket carried by the rotating structure, semi-cylindrical members pivoted upon the bracket and embodying curved edges positioned to meet to form a curved corner, means to lift the bag into engagement with the opposite members and upon opposite sides of the curved corner, means to move the members pivotally to expand them within the bag, means to twist the bag firmly upon the expanded members, a filling tube carried by the rotating structure and mounted to reciprocate vertically within the expanded members and the bag, and means to introduce material into the filling tube.

33. In a bagging machine, a bag holder embodying expansible sections, hooks mounted upon opposite sides of and adapted to move in timed relation with the sections and adapted to engage a bag and hold it in operative position upon the sections, and means to rotate the hooks and engaged sections of the bag.

34. In a bagging machine, a bag holder comprising substantially semi-cylindrical sections, a pivoted frame adjacent the sections, hooks mounted to rotate upon the frame upon opposite sides of the sections and adapted to engage a bag and lift it and hold it encircling the sections, and means to rotate the hooks simultaneously.

In testimony whereof I affix my signature in presence of two witnesses.

CHARLES DOUGLAS CROMLEY.

Witnesses:
CHAS. H. PINNEO,
ALBERT SONNENBERG.